United States Patent
Nishimura

(10) Patent No.: US 11,611,878 B2
(45) Date of Patent: Mar. 21, 2023

(54) VEHICLE COMMUNICATION DEVICE

(71) Applicant: Mitsubishi Electric Corporation, Tokyo (JP)

(72) Inventor: Ryosuke Nishimura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 346 days.

(21) Appl. No.: 16/770,972

(22) PCT Filed: Apr. 16, 2018

(86) PCT No.: PCT/JP2018/015661
§ 371 (c)(1),
(2) Date: Jun. 9, 2020

(87) PCT Pub. No.: WO2019/202626
PCT Pub. Date: Oct. 24, 2019

(65) Prior Publication Data
US 2021/0168609 A1 Jun. 3, 2021

(51) Int. Cl.
H04W 4/46 (2018.01)
G08G 1/0967 (2006.01)
(Continued)

(52) U.S. Cl.
CPC ...... *H04W 12/069* (2021.01); *G08G 1/09675* (2013.01); *H04W 4/44* (2018.02);
(Continued)

(58) Field of Classification Search
CPC ........... H04W 4/44; H04W 4/46; H04W 4/40; H04W 12/06; H04W 12/069;
(Continued)

(56) References Cited

U.S. PATENT DOCUMENTS 10,217,357 B1 * 2/2019 Elsheemy ............ G08G 1/0112
2013/0145159 A1 6/2013 Nakaoka et al.
(Continued)

FOREIGN PATENT DOCUMENTS

JP 2006-238035 A 9/2006
JP 2006238035 A * 9/2006
(Continued)

OTHER PUBLICATIONS

Communication dated Feb. 22, 2022 from the Chinese Patent Office in Chinese Application No. 201880092093.1.
(Continued)

*Primary Examiner* — San Htun
*Assistant Examiner* — Farideh Madani
(74) *Attorney, Agent, or Firm* — Sughrue Mion, PLLC; Richard C. Turner

(57) ABSTRACT

Traveling road information including traveling roads of another vehicle and the own vehicle is acquired on the basis of own-vehicle information and other-vehicle information received by a reception unit. Whether or not verification processing is needed for verification information accompanying the other-vehicle information received by the reception unit is determined on the basis of the traveling road information and the other-vehicle information. Thus, a message unnecessary for the own vehicle is not subjected to verification, so that the load on the vehicle communication device is reduced.

11 Claims, 6 Drawing Sheets

(51) Int. Cl.
- *G08G 1/0965* (2006.01)
- *H04W 12/069* (2021.01)
- *H04W 4/44* (2018.01)
- *H04W 12/08* (2021.01)
- *H04W 84/18* (2009.01)

(52) U.S. Cl.
CPC ............ *H04W 4/46* (2018.02); *H04W 12/08* (2013.01); *H04W 84/18* (2013.01)

(58) Field of Classification Search
CPC . H04W 84/18; G08G 1/09675; G08G 1/0967; G08G 1/0965; G08G 1/0968
See application file for complete search history.

(56) References Cited

U.S. PATENT DOCUMENTS

| | | | | |
|---|---|---|---|---|
| 2016/0244054 | A1* | 8/2016 | Kindo | ............... B60W 10/18 |
| 2017/0003134 | A1* | 1/2017 | Kim | ............... G08G 1/09623 |
| 2017/0076605 | A1 | 3/2017 | Suzuki et al. | |
| 2019/0221118 | A1* | 7/2019 | Kume | ............... B60W 50/14 |

FOREIGN PATENT DOCUMENTS

| | | | |
|---|---|---|---|
| JP | 2010-170239 | A | 8/2010 |
| JP | 2012-100024 | A | 5/2012 |
| JP | 2012-147323 | A | 8/2012 |
| JP | 2015-191583 | A | 11/2015 |
| JP | 2018-018245 | A | 2/2018 |
| JP | 2018018245 | A * | 2/2018 |
| WO | 2012/008158 | A1 | 1/2012 |

OTHER PUBLICATIONS

Communication dated Mar. 2, 2021 by the Japanese Patent Office in application No. 2020-514797.
Communication dated Sep. 14, 2021 by the Japanese Patent Office in application No. 2020-514797.
International Search Report for PCT/JP2018/015661 dated Jul. 17, 2018 [PCT/ISA/210].
Office Action dated Aug. 1, 2022 issued by the Chinese Patent Office in Chinese Application No. 201880092093.1.

* cited by examiner

VEHICLE COMMUNICATION DEVICE

CROSS REFERENCE TO RELATED APPLICATIONS

This application is a National Stage of International Application No. PCT/JP2018/015661 filed Apr. 16, 2018.

TECHNICAL FIELD

The present disclosure relates to a vehicle communication device.

BACKGROUND ART

There has been known V2X (Vehicle to X) communication which can be utilized as technology for notifying a driver of danger by performing communication between vehicles (Vehicle to Vehicle: V2V) and communication between a vehicle and a roadside unit (Vehicle to Infrastructure: V2I), thereby preventing an accident beforehand.

V2X is broadcast-type communication and allows anyone to transmit/receive information. Therefore, there is a risk that a malicious person might falsify the information. In this regard, technology using a message including a signature, a public key, and a public key certificate in addition to information about a vehicle is known. In this technology, by a communication device of a vehicle that has received a message, whether or not the public key is authentic is verified on the basis of the public key certificate, and whether or not the information is falsified is verified on the basis of the signature and the public key.

In V2X, several hundreds of vehicles perform communications in short cycles of about 100 ms. Therefore, a heavy load is imposed for verifying all the received messages, and thus there is a problem that it is impossible to perform verification in real time when the number of communicating vehicles increases.

Considering this, technology in which the content of received information is confirmed in advance before verification is performed, and only information necessary for a vehicle is verified, is proposed (for example, Patent Document 1).

Patent Document 1 discloses technology in which priorities of received messages are determined on the basis of a vehicle position, movement-related information (speed, acceleration, advancing direction), and the like, and verification processing is performed from messages having high priorities, thereby quickly acquiring information necessary for the vehicle.

CITATION LIST

Patent Document

Patent Document 1: Japanese Laid-Open Patent Publication No. 2012-100024 (see paragraph [0060] to paragraph [0073], FIG. 5)

SUMMARY OF THE INVENTION

Problems to be Solved by the Invention

The priority determination in Patent Document 1 is performed on the basis of whether or not the information is information considered to be high in urgency or importance for the own vehicle, i.e., information about another vehicle that is close to the own vehicle, is approaching the own vehicle, or is close to an intersection. Therefore, for example, another vehicle on an opposing lane across a wide central reservation having fences or another vehicle traveling on a frontage road separated by a wall or the like provided on a side of a traveling road is determined to be a high-priority vehicle even though the vehicle is low in urgency for the own vehicle, so that information from that vehicle is also treated as a target of verification processing. Therefore, this technology has a problem that the load of verification processing and driving assistance processing on the communication device of the own vehicle increases, and it is required to reduce the load of reception processing by extracting another vehicle that is high in urgency for the own vehicle.

The present disclosure has been made to solve the above problem, and an object of the present disclosure is to reduce the load of reception processing on the communication device by refraining from verifying a message unnecessary for the own vehicle.

Solution to the Problems

A vehicle communication device according to the present disclosure includes: a reception unit for receiving, from another vehicle, other-vehicle information accompanied with verification information including at least one of a signature and a certificate; an own-vehicle information acquisition unit for acquiring own-vehicle information; a traveling road analysis unit which analyzes traveling roads of the other vehicle and the own vehicle on the basis of the other-vehicle information received by the reception unit and the own-vehicle information acquired by the own-vehicle information acquisition unit, and outputs traveling road information; a determination unit for determining whether or not processing is needed for the verification information accompanying the other-vehicle information received by the reception unit, on the basis of the other-vehicle information and the traveling road information; and a received information processing unit which, when the determination unit determines that the processing is needed, performs verification processing for the verification information received by the reception unit, and performs driving assistance processing on the basis of the other-vehicle information accompanied with the verification information that has undergone the verification processing.

Another vehicle communication device according to the present disclosure includes: a reception unit for receiving, from another vehicle, other-vehicle information accompanied with verification information including at least one of a signature and a certificate; an own-vehicle information acquisition unit for acquiring own-vehicle information; a map information acquisition unit for acquiring map information; a traveling road analysis unit which analyzes traveling roads of the other vehicle and the own vehicle on the basis of the other-vehicle information received by the reception unit, the own-vehicle information acquired by the own-vehicle information acquisition unit, and the map information acquired by the map information acquisition unit, and outputs traveling road information; a determination unit for determining whether or not processing is needed for the verification information accompanying the other-vehicle information acquired by the reception unit, on the basis of the other-vehicle information, the traveling road information, and the map information; and a received information processing unit which, when the determination unit determines that the processing is needed, performs verification processing for the verification information received by the reception unit, and performs driving assistance processing on the basis of the other-vehicle information accompanied with the verification information that has undergone the verification processing.

Effect of the Invention

In the vehicle communication device according to the present disclosure, whether or not verification processing is needed for verification information accompanying the other-vehicle information received by the reception unit is determined on the basis of the other-vehicle information and the traveling road information. Thus, a message unnecessary for the own vehicle is not subjected to verification, so that the load of the verification processing in the vehicle communication device can be reduced.

BRIEF DESCRIPTION OF THE DRAWINGS

FIG. 2 conceptually shows a message transmitted from another vehicle and including a certificate, a signature, other-vehicle information, and the like.

DESCRIPTION OF EMBODIMENTS

Figure 1:
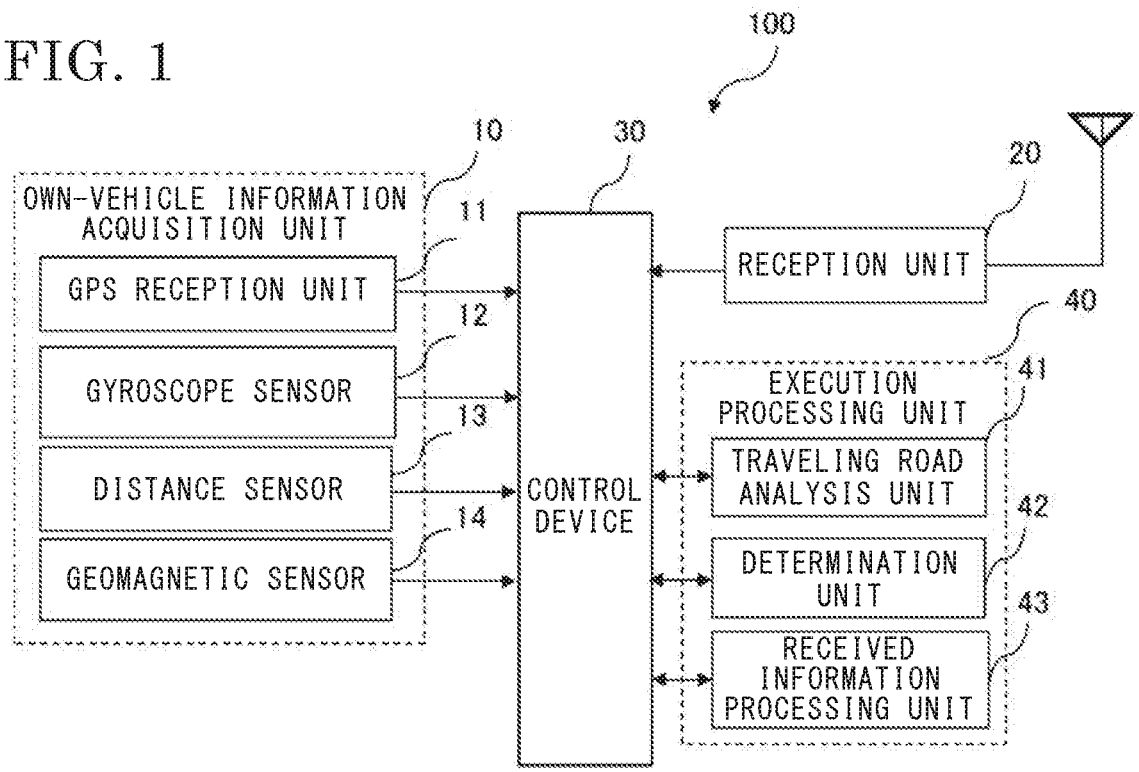
FIG. 1 is a block diagram showing the schematic configuration of a vehicle communication device according to embodiment 1.

Hereinafter, the present embodiment will be described with reference to the drawings. In the drawings, the same reference characters denote the same or corresponding parts.

Embodiment 1

Hereinafter, a vehicle communication device according to embodiment 1 will be described with reference to FIG. 1 to FIG. 4.

Figure 2:
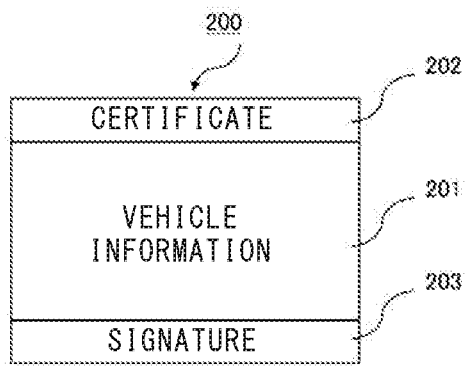

FIG. 1 is a block diagram showing the schematic configuration of a vehicle communication device 100 according to embodiment 1. FIG. 2 conceptually shows a message transmitted from another vehicle and including a certificate, a signature, and other-vehicle information. In the drawing, the vehicle communication device 100 includes a reception unit 20 for receiving a message from another vehicle, an own-vehicle information acquisition unit 10 for acquiring information about the own vehicle such as the acceleration of the own vehicle, and a control device 30 for performing driving assistance control through execution of application software by an execution processing unit 40 on the basis of a message received from another vehicle by the reception unit 20 and own-vehicle information acquired by the own-vehicle information acquisition unit 10.

As shown in FIG. 2, a message 200 transmitted by broadcasting from another vehicle via an antenna connected to the reception unit 20 includes vehicle information (vehicle information about another vehicle is hereafter referred to as other-vehicle information) 201 including information such as the vehicle position, the traveling record, and vehicle movement information including the speed, the acceleration, and the advancing direction, a certificate 202 issued by a certificate authority (CA) for certifying that the transmission source is authentic, and a signature 203 for certifying that the vehicle information is not falsified. In the present embodiment, desirably, the message 200 includes at least one of the certificate 202 and the signature 203, to ensure authentication of the message or reliability of the vehicle information.

The own-vehicle information acquisition unit 10 includes a GPS reception unit 11 for a global positioning system (GPS) that detects the present position of the own vehicle on the basis of radio waves from an artificial satellite, a gyro sensor 12 for detecting the angular velocity of the own vehicle about the vertical direction, a distance sensor 13 for measuring the distance to an object around the own vehicle, a geomagnetic sensor 14 for detecting the speed of the own vehicle on the basis of the rotation speed of a driving wheel, and the like. The own-vehicle information acquisition unit 10 regularly performs detection for the present position, the advancing direction, and the like of the own vehicle, and acquires information (hereinafter, referred to as own-vehicle information) including the vehicle position, the traveling record, and vehicle movement information including the speed, the acceleration, and the advancing direction, as own-vehicle information. It is noted that a sensor other than the sensors described above may be used.

Figure 3:
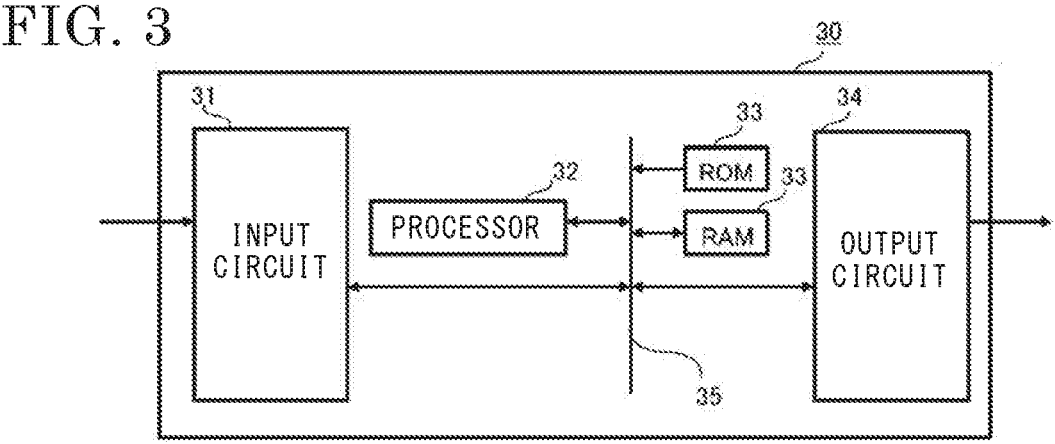
FIG. 3 is a hardware configuration diagram of a control device.

FIG. 3 is a hardware configuration diagram of the control device 30. The control device 30 includes a processor 32 which is any of a central processing unit (CPU), a graphics processing unit (GPU), and a digital processing unit (DPU), storage devices 33 such as a read only memory (ROM) and a random access memory (RAM), an input circuit 31, an output circuit 34, and a bus 35 for connecting these.

The storage devices 33 transmit/receive information to/from the processor 32, and store other-vehicle information, own-vehicle information, and the like as appropriate.

Application software of the execution processing unit 40 is installed on the control device 30, and a traveling road analysis unit 41, a determination unit 42, and a received information processing unit 43 operate on the control device 30.

The traveling road analysis unit 41 performs estimation for the traveling roads of another vehicle and the own vehicle on the basis of the other-vehicle information and the own-vehicle information.

The determination unit 42 performs determination as to urgency.

The received information processing unit 43 has a function of verifying the other-vehicle information 201 on the basis of the certificate 202 or the signature 203 of the received message 200 or both of them, and a function of executing a driving assistance application (not shown) installed on this vehicle communication device.

To recognize the traveling road of another vehicle, the own vehicle needs to acquire the road shape around the own vehicle. However, in the present embodiment, there is no means such as a navigation system for acquiring the surrounding road shape, and therefore, in order to recognize the traveling roads of another vehicle and the own vehicle, the road shape around the own vehicle is estimated by alternative means. Specifically, the surrounding road shape is estimated using the own-vehicle information and other-vehicle information received from another vehicle via the reception unit 20. From a result thereof and position information about the own vehicle and the other vehicle, the traveling road of the other vehicle is estimated.

Figure 4:
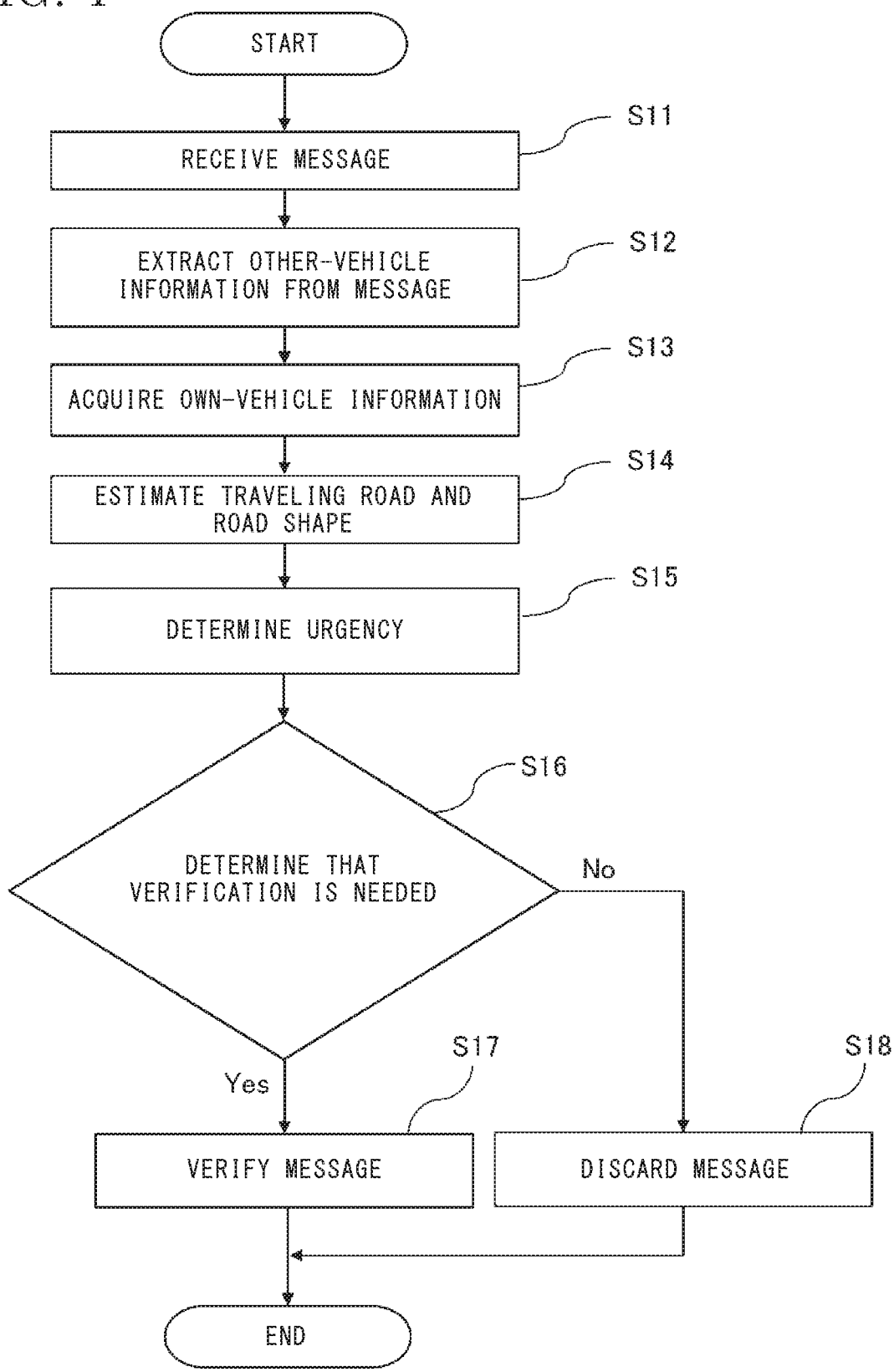
FIG. 4 is a flowchart showing a verification procedure for other-vehicle information in the vehicle communication device according to embodiment 1.

With reference to the flowchart shown in FIG. 4, the procedure for verifying other-vehicle information in the vehicle communication device according to the present embodiment 1 will be described.

First, the reception unit 20 receives a message 200 transmitted by broadcasting from another vehicle (step S11). The traveling road analysis unit 41 extracts the other-vehicle information 201 included in the message 200 (step S12). Next, the traveling road analysis unit 41 acquires own-vehicle information from the own-vehicle information acquisition unit 10 (step S13), estimates the traveling road of the own vehicle, the traveling road of the other vehicle, and the road shape, and transmits them as traveling road information to the determination unit 42 (step S14).

The determination unit 42 performs determination as to urgency on the basis of the other-vehicle information 201 and the traveling road information from the traveling road analysis unit 41 (step S15), and determines whether or not it is necessary to verify verification information including at least one of the signature 203 and the certificate 202 accompanying the other-vehicle information 201 (step S16). If it is determined that the urgency is low (No in step S16), the other-vehicle information is not transferred to the received information processing unit 43 and the message including this other-vehicle information is discarded (step S18). If the determination unit 42 determines that the urgency is high, it is determined that verification for the other-vehicle information 201 is needed (Yes in step S16). Then, regarding the other-vehicle information 201, the received information processing unit 43 verifies the other-vehicle information 201 on the basis of the signature 203 or the certificate 202 accompanying the other-vehicle information 201, or both of them (step S17), and if the other-vehicle information is authentic information, the information about the other vehicle and the own vehicle is inputted to the driving assistance application.

In the driving assistance application, when the authentic information with high urgency is inputted, the driver is notified by a warning indication on a monitor, sound, an alarm, or the like, or operation is performed in coordination with an advanced driving assistant system (ADAS) function such as automated braking, thereby proceeding to avoid an emergency situation.

The determination unit 42 determines whether or not verification for the other-vehicle information is needed, using both of the other-vehicle information and the traveling road information from the traveling road analysis unit 41. Therefore, accuracy of determination as to necessity of the verification processing is higher than in the case of performing determination using only the traveling road information.

For example, even in the case where the traveling road information indicates that the traveling road of the own vehicle and the traveling road of the other vehicle are the same road, if it is found from the position information that the own vehicle and the other vehicle are at positions sufficiently distant from each other, it can be determined that the urgency is low and verification for the other-vehicle information is not needed. This corresponds to the case where the distance between the own vehicle and the other vehicle is greater than a predetermined threshold. On the other hand, in the case where the other vehicle traveling in front of the own vehicle on the same traveling road, i.e., the same lane, brakes hard so that the distance between the own vehicle and the other vehicle becomes equal to or smaller than the threshold, it is determined that the urgency is high. In this way, an index such as a distance threshold is used for urgency determination. The urgency determination leads to a warning notification or the like by the driving assistance application as described above.

Figure 5A:
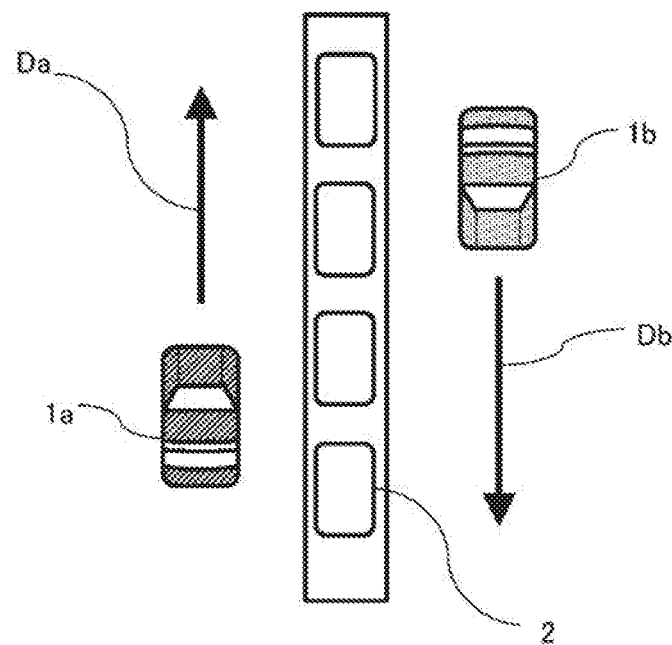
FIG. 5A is a schematic view showing an example of locations of traveling vehicles.
Figure 5B:
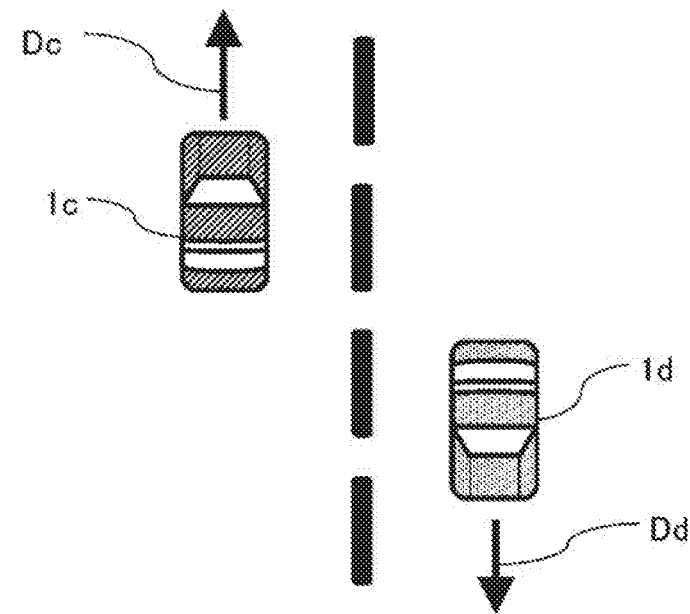
FIG. 5B is a schematic view showing an example of locations of traveling vehicles.
Figure 5C:
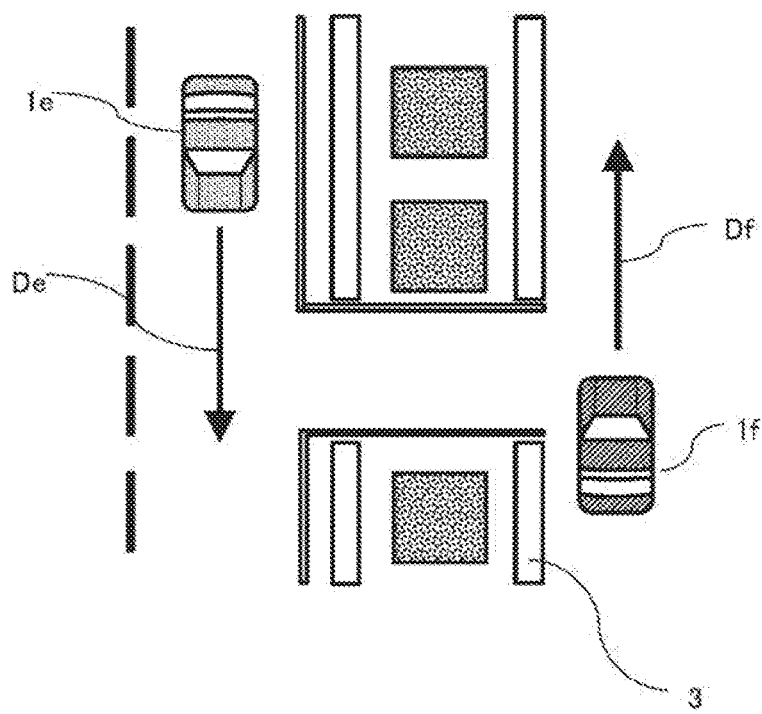
FIG. 5C is a schematic view showing an example of locations of traveling vehicles.

FIGS. 5A to 5C show examples of locations of traveling vehicles. In FIG. 5A, it is assumed that an own vehicle 1a is traveling in a direction Da on an elevated road and another vehicle 1b is traveling in a direction Db on a frontage road below the elevated road with a protective wall 2 therebetween. In the case of using only the traveling road information or closeness information between vehicles as in Patent Document 1, urgency regarding the other vehicle 1b is high for the own vehicle 1a. However, since information such as the details of the distance between the vehicles and the height relationship between both vehicle traveling roads can be acquired from the position information or the traveling record, it is found that urgency regarding the other vehicle 1b is low for the own vehicle 1a and it can be finally determined that verification for the other-vehicle information is not needed.

In FIG. 5B, it is assumed that, on a two-way traffic road, an own vehicle 1c is traveling in a direction Dc and another vehicle 1d is traveling in a direction Dd. In the case of using only the traveling road information or closeness information between vehicles as in Patent Document 1, both vehicles are regarded as close to each other, so that the urgency is high. However, from the traveling direction information, it is found that both vehicles have already passed by each other, so that urgency regarding the other vehicle 1d is low for the own vehicle 1c and it can be finally determined that verification for the other-vehicle information is not needed.

In FIG. 5C, it is assumed that, on a road having a central reservation 3 with high fences, an own vehicle 1e is traveling in a direction De and another vehicle 1f is traveling in a direction Df. In the case of using only the traveling road information or only closeness information between vehicles as in Patent Document 1, both vehicles are regarded as close to each other, so that the urgency is high. However, as in the case of FIG. 5A, from the position information or the traveling record, it is found that urgency regarding the other vehicle 1f is low for the own vehicle 1e and it can be finally determined that verification for the other-vehicle information is not needed.

The traveling road information and the other-vehicle information have been used as information to be considered in the determination unit 42. However, including also the own-vehicle information further improves determination accuracy. In such a case where, for example, there are a large number of other vehicles, the own-vehicle information may be unnecessary.

As described above, according to embodiment 1, whether or not verification processing is needed for verification information accompanying other-vehicle information received by the reception unit 20 is determined on the basis of the traveling road information and the other-vehicle information. Thus, messages unnecessary for the own vehicle are not subjected to verification, so that the load of the reception processing in the vehicle communication device 100 can be reduced.

Embodiment 2

In the present embodiment 2, a vehicle communication device that allows the own vehicle to acquire map information will be described. Such a configuration allows the traveling road analysis unit to identify the traveling roads of the own vehicle and another vehicle on the basis of map information of the own vehicle and position information included in the other-vehicle information, without estimating the road shape of the surrounding road from the traveling record of the other vehicle.

Figure 6:
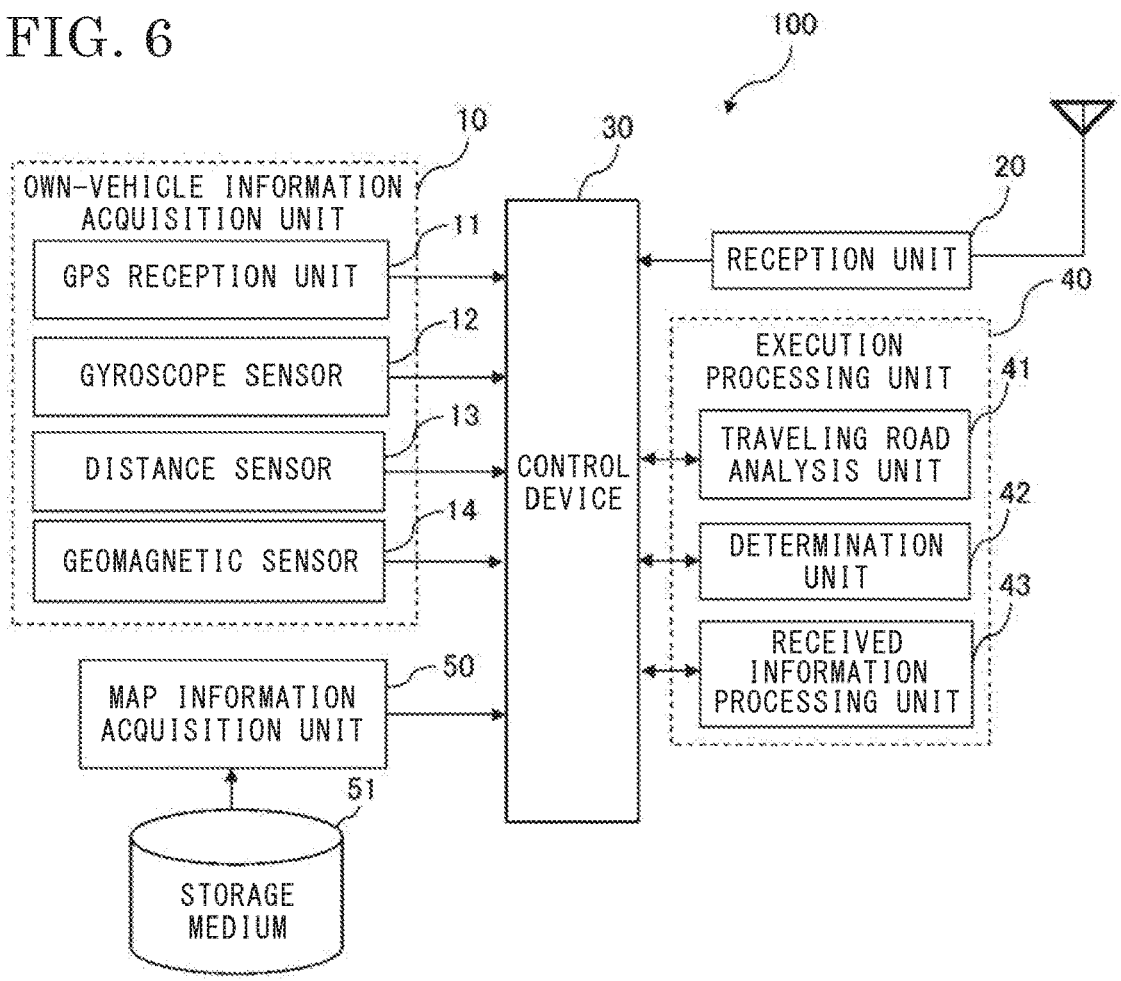
FIG. 6 is a block diagram showing the schematic configuration of a vehicle communication device according to embodiment 2.

FIG. 6 is a block diagram showing the schematic configuration of the vehicle communication device 100 according to embodiment 2. The vehicle communication device 100 is provided with a map information acquisition unit 50, e.g., a navigation system, for acquiring map information from an external storage medium 51 such as a hard disk drive (HDD) or a secure digital (SD) memory card. The other configurations are the same as in embodiment 1, and the description thereof is omitted.

Figure 7:
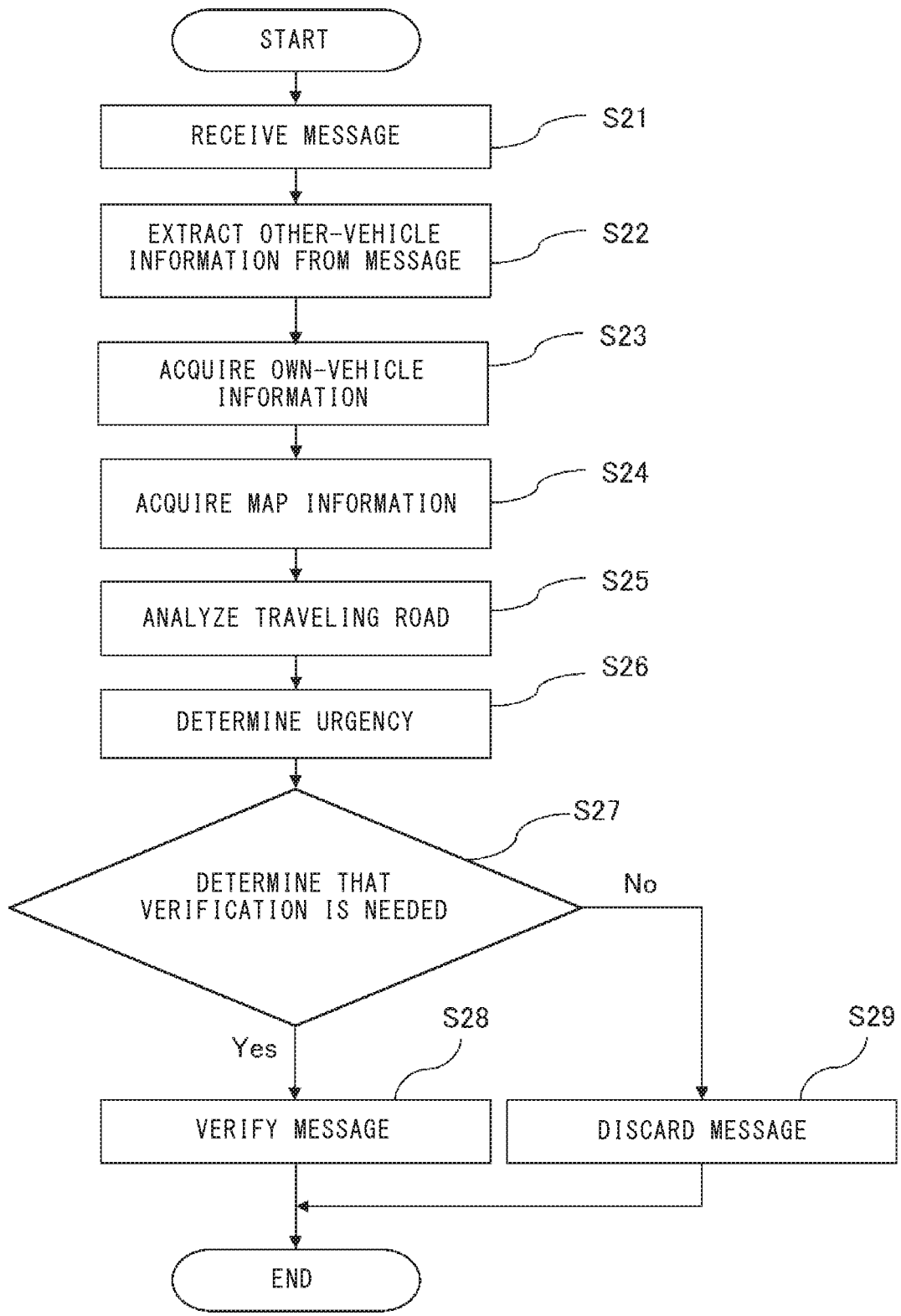
FIG. 7 is a flowchart showing a verification procedure for other-vehicle information in the vehicle communication device according to embodiment 2.

FIG. 7 is a flowchart showing a verification procedure for other-vehicle information 201 in the vehicle communication device 100 according to embodiment 2. With reference to the flowchart, the verification procedure for the other-vehicle information 201 will be described.

First, the reception unit 20 receives a message 200 transmitted by broadcasting from another vehicle (step S21). The traveling road analysis unit 41 extracts other-vehicle information 201 included in the message 200 (step S22). Next, the traveling road analysis unit 41 acquires own-vehicle information from the own-vehicle information acquisition unit 10 (step S23), and acquires map information from the map information acquisition unit 50 (step S24). The traveling road analysis unit 41 analyzes traveling road information on the basis of the acquired other-vehicle information 201, own-vehicle information, and map information, and transmits the analysis result together with the map information to the determination unit 42 (step S25).

The determination unit 42 performs determination as to urgency on the basis of the other-vehicle information 201, the map information, and the traveling road information from the traveling road analysis unit 41 (step S26), and determines whether or not it is necessary to verify verification information including at least one of the signature 203 and the certificate 202 accompanying the other-vehicle information 201 (step S27). If it is determined that urgency is low (No in step S27), the other-vehicle information 201 is not transferred to the received information processing unit 43, and the message 200 including the other-vehicle information 201 is discarded (step S29). If the determination unit 42 determines that urgency is high, it is determined that verification for the other-vehicle information 201 is needed (Yes in step S27). Then, regarding the other-vehicle information 201, the received information processing unit 43 verifies the other-vehicle information 201 on the basis of the signature 203 or the certificate 202 accompanying the other-vehicle information 201, or both of them (step S28), and if the other-vehicle information is authentic information, the information about the other vehicle and the own vehicle is inputted to the driving assistance application.

With the above configuration, in step S25, the traveling road analysis unit 41 can easily identify the traveling roads of the own vehicle and the other vehicle on the basis of the map information and the position information. As in embodiment 1, whether or not verification processing is needed may be determined on the basis of vehicle information included in the other-vehicle information 201 and the own-vehicle information. In such a case where, for example, there are a large number of other vehicles, the own-vehicle information may be unnecessary.

As described above, according to embodiment 2, as in embodiment 1, whether or not processing is needed for verification information accompanying other-vehicle information received by the reception unit 20 is determined on the basis of the traveling road information and the other-vehicle information. Thus, messages unnecessary for the own vehicle are not subjected to verification, so that the load of the reception processing in the vehicle communication device 100 can be reduced. In addition, since the map information around the vehicle is acquired by the map information acquisition unit 50, it becomes possible to easily identify the traveling roads of the own vehicle and another vehicle.

Embodiment 3

In the present embodiment, an example in which, in embodiments 1, 2, other-vehicle information for which the determination unit 42 determines that verification processing is needed is stored in the storage device 33 of the control device 30, will be described.

In V2X using broadcast-type communication, several hundreds of vehicles perform communications with short cycles of about 100 ms. Therefore, even in the case of selectively using information for which it is determined that verification processing is needed, a large amount of other-vehicle information is to be received within a short time. Therefore, in some cases, verification processing in the received information processing unit 43 cannot keep up with the frequency of reception of other-vehicle information. In such a case where the verification processing load is high, other-vehicle information that has not undergone verification processing yet is temporarily stored in the storage device 33, thereby enabling adjustment of the processing load and the like.

Figure 8:
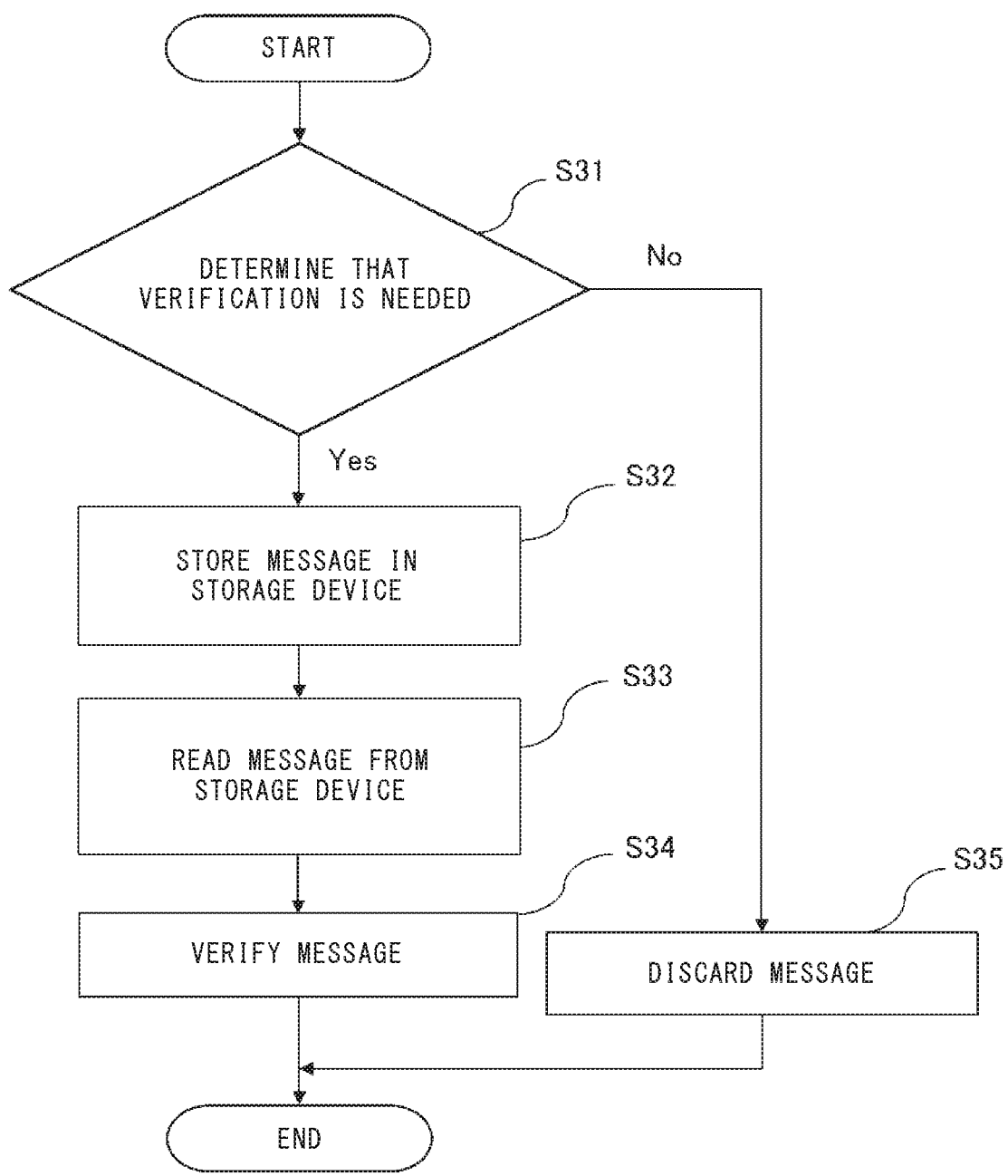
FIG. 8 is a flowchart showing a procedure for storing and reading a message received by a vehicle communication device according to embodiment 3.

FIG. 8 is a flowchart showing the procedure for storing and reading the message 200 received by the vehicle communication device 100 in the case where the determination unit 42 determines that verification processing is needed for the message 200. Hereinafter, the procedure will be described with reference to the flowchart.

First, the message 200 for which the determination unit 42 determines that verification is needed (Yes in step S31) is stored in the storage device 33 (step S32). On the other hand, the message 200 for which the determination unit 42 determines that verification is not needed (No in step S31) is discarded without being stored in the storage device 33 (step S35).

The received information processing unit 43 reads the message 200 from the storage device 33 (step S33), verifies the other-vehicle information 201 on the basis of the signature 203 or the certificate 202 accompanying the other-vehicle information 201 of the message 200, or both of them (step S34), and if it is determined that the other-vehicle information is authentic information, the information is inputted to the driving assistance application.

Reading of the message 200 by the received information processing unit 43 may be performed in the storing order of the information, or the other-vehicle information 201 that is determined to be important for the driving assistance application or the own vehicle by the determination unit 42 may be preferentially subjected to verification processing.

As described above, according to embodiment 3, the other-vehicle information 201 that has not undergone verification processing yet is temporarily stored in the storage device 33. Thus, it becomes possible to perform adjustment of the verification processing load and the like, leading to load reduction of the vehicle communication device 100.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1a, 1b, 1c, 1d, 1e, 1f vehicle
2 protective wall
3 central reservation
110 own-vehicle information acquisition unit
11 GPS reception unit
12 gyro sensor
13 distance sensor
14 geomagnetic sensor
20 reception unit
30 control device
31 input circuit
32 processor
33 storage device
34 output circuit
35 bus
40 execution processing unit
41 traveling road analysis unit
42 determination unit
43 received information processing unit
50 map information acquisition unit
51 storage medium
100 vehicle communication device
200 message
201 vehicle information
202 certificate
203 signature

The invention claimed is:

1. A vehicle communication device comprising:
a receiver to receive, from another vehicle, other-vehicle information accompanied with verification information including at least one of a signature and a certificate;
an own-vehicle information acquirer to acquire own-vehicle information;
a traveling road analyzer which analyzes traveling roads of the other vehicle and the own vehicle on the basis of the other-vehicle information received by the receiver and the own-vehicle information acquired by the own-vehicle information acquirer, and outputs traveling road information;
a determiner to determine whether or not processing is needed for the verification information accompanying the other-vehicle information received by the receiver, on the basis of the other-vehicle information and the traveling road information; and
a received information processor which, when the determiner determines that the processing is needed, performs verification processing for the verification information received by the receiver, and performs driving assistance processing on the basis of the other-vehicle information accompanied with the verification information that has undergone the verification processing,
wherein the determiner determines processing is not needed for the verification information on the basis of at least one of the traveling direction information and the other-vehicle information indicating that the own vehicle and the other vehicle have passed each other.

2. The vehicle communication device according to claim 1, further comprising a storage device for storing the other-vehicle information, wherein
the other-vehicle information accompanied with the verification information for which the determiner determines that the processing is needed, is stored.

3. The vehicle communication device according to claim 1, wherein
when the determiner determines that the processing is not needed, the verification information received by the receiver is not subjected to the verification processing.

4. The vehicle communication device according to claim 3, further comprising a storage device for storing the other-vehicle information, wherein
the other-vehicle information accompanied with the verification information for which the determiner determines that the processing is not needed, is not stored in the storage device.

5. The vehicle communication device according to claim 1, further comprising a storage device for storing the other-vehicle information, wherein
the other-vehicle information accompanied with the verification information for which the determiner determines that the processing is not needed, is not stored in the storage device.

6. A vehicle communication device comprising:
a receiver to receive, from another vehicle, other-vehicle information accompanied with verification information including at least one of a signature and a certificate;
an own-vehicle information acquirer to acquire own-vehicle information;
a map information acquirer to acquire map information;
a traveling road analyzer which analyzes traveling roads of the other vehicle and the own vehicle on the basis of the other-vehicle information received by the receiver, the own-vehicle information acquired by the own-vehicle information acquirer, and the map information acquired by the map information acquirer, and outputs traveling road information;
a determiner to determine whether or not verification processing is needed for the verification information accompanying the other-vehicle information acquired by the receiver, on the basis of the other-vehicle information, the traveling road information, and the map information; and
a received information processor which, when the determiner determines that the processing is needed, performs verification processing for the verification information received by the receiver, and performs driving assistance processing on the basis of the other-vehicle information accompanied with the verification information that has undergone the verification processing, wherein the determiner determines processing is not needed for the verification information on the basis of at least one of the other-vehicle information, the traveling road information and the map information indicating that a wall is positioned between the own vehicle and the other vehicle.

7. The vehicle communication device according to claim 6, further comprising a storage device for storing the other-vehicle information, wherein the other-vehicle information accompanied with the verification information for which the determiner determines that the processing is needed, is stored.

8. The vehicle communication device according to claim 6, wherein when the determiner determines that the processing is not needed, the verification information received by the receiver is not subjected to the verification processing.

9. The vehicle communication device according to claim 8, further comprising a storage device for storing the other-vehicle information, wherein the other-vehicle information accompanied with the verification information for which the determiner determines that the processing is not needed, is not stored in the storage device.

10. The vehicle communication device according to claim 6, further comprising a storage device for storing the other-vehicle information, wherein the other-vehicle information accompanied with the verification information for which the determiner determines that the processing is not needed, is not stored in the storage device.

11. A vehicle communication device comprising:

a receiver to receive, from another vehicle, other-vehicle information accompanied with verification information including at least one of a signature and a certificate;

an own-vehicle information acquirer to acquire own-vehicle information;

a traveling road analyzer which analyzes traveling roads of the other vehicle and the own vehicle on the basis of the other-vehicle information received by the receiver and the own-vehicle information acquired by the own-vehicle information acquirer, and outputs traveling road information;

a determiner to determine whether or not processing is needed for the verification information accompanying the other-vehicle information received by the receiver, on the basis of the other-vehicle information and the traveling road information; and a received information processor which, when the determiner determines that the processing is needed, performs verification processing for the verification information received by the receiver, and performs driving assistance processing on the basis of the other-vehicle information accompanied with the verification information that has undergone the verification processing, wherein the determiner determines processing is not needed for the verification information on the basis of at least one of the other-vehicle information and the traveling road information indicating that a height of a road on which the own vehicle travels is different from a height of a road on which the other vehicle travels.

* * * * *